United States Patent
Cao

(10) Patent No.: US 10,317,759 B2
(45) Date of Patent: Jun. 11, 2019

(54) ARRAY SUBSTRATE AND LIQUID CRYSTAL DISPLAY PANE

(71) Applicant: Shenzhen China Star Optoelectronics Technology Co., Ltd., Shenzhen, Guangdong (CN)

(72) Inventor: Shangcao Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 270 days.

(21) Appl. No.: 14/778,754

(22) PCT Filed: Aug. 13, 2015

(86) PCT No.: PCT/CN2015/086881
§ 371 (c)(1),
(2) Date: Sep. 21, 2015

(87) PCT Pub. No.: WO2017/024587
PCT Pub. Date: Feb. 16, 2017

(65) Prior Publication Data
US 2017/0219894 A1   Aug. 3, 2017

(30) Foreign Application Priority Data

Aug. 10, 2015 (CN) .......................... 2015 1 0487331

(51) Int. Cl.
*G02F 1/1362* (2006.01)
*G02F 1/1343* (2006.01)
(Continued)

(52) U.S. Cl.
CPC ...... *G02F 1/136286* (2013.01); *G02F 1/1368* (2013.01); *G02F 1/13439* (2013.01);
(Continued)

(58) Field of Classification Search
CPC ......... G02F 1/134363; G02F 1/134309; G02F 1/133707; G02F 2001/134372;
(Continued)

(56) References Cited

U.S. PATENT DOCUMENTS

| | | | |
|---|---|---|---|
| 5,734,457 A * | 3/1998 | Mitsui | G02F 1/133514 349/105 |
| 7,142,274 B2 * | 11/2006 | Kitagawa | G02F 1/134363 349/110 |
| 8,318,527 B2 | 11/2012 | Fujiyoshi et al. | |
| 2005/0253984 A1 | 11/2005 | Kim et al. | |
| 2006/0001803 A1 * | 1/2006 | Park | G02F 1/13439 349/113 |

(Continued)

FOREIGN PATENT DOCUMENTS

| CN | 1779519 A | 5/2006 |
|---|---|---|
| CN | 101430397 A | 5/2009 |

(Continued)

*Primary Examiner* — Hoan C Nguyen
(74) *Attorney, Agent, or Firm* — Andrew C. Cheng

(57) ABSTRACT

The invention provides an array substrate and a liquid crystal display panel, by means of that colored photoresist layers of different colors disposed above metal wires are overlapped with each other to thereby form an opaque light shielding layer covering the metal wires so as to replace a black matrix, and therefore there is no need of a mask process for preparing the black matrix, so that it could reduce types and numbers of used masks, simplify manufacturing process and reduce production costs.

7 Claims, 3 Drawing Sheets

(51) Int. Cl.
   *G02F 1/1333*   (2006.01)
   *G02F 1/1335*   (2006.01)
   *G02F 1/1368*   (2006.01)

(52) U.S. Cl.
   CPC .. *G02F 1/133345* (2013.01); *G02F 1/133514* (2013.01); *G02F 1/134363* (2013.01); *G02F 1/136209* (2013.01); *G02F 1/133509* (2013.01); *G02F 2001/133357* (2013.01); *G02F 2001/134372* (2013.01); *G02F 2001/136222* (2013.01); *G02F 2201/121* (2013.01); *G02F 2201/123* (2013.01)

(58) Field of Classification Search
   CPC ........ G02F 2001/134381; G02F 2001/134318; G02F 2201/124; G02F 1/133345; G02F 1/133514; G02F 1/136286; G02F 1/13439; G02F 1/136209; G02F 1/1368; G02F 2001/133357; G02F 2201/121; G02F 2201/123
   See application file for complete search history.

(56) References Cited

U.S. PATENT DOCUMENTS

| | | | |
|---|---|---|---|
| 2007/0216832 A1* | 9/2007 | Takahashi | G02F 1/133516 349/106 |
| 2008/0074572 A1* | 3/2008 | Kim | G02F 1/134363 349/44 |
| 2011/0050551 A1* | 3/2011 | Ota | G02F 1/134363 345/87 |
| 2012/0088325 A1 | 4/2012 | Fujiyoshi et al. | |
| 2013/0027646 A1 | 1/2013 | Cho et al. | |
| 2013/0077008 A1 | 3/2013 | Kim et al. | |
| 2013/0107151 A1* | 5/2013 | Sasaki | G02F 1/134363 349/38 |
| 2014/0168584 A1* | 6/2014 | Lee | G02F 1/133512 349/106 |

FOREIGN PATENT DOCUMENTS

| | | | |
|---|---|---|---|
| CN | 104808411 A | | 7/2015 |
| JP | 63040101 A | * | 2/1988 |

* cited by examiner

ARRAY SUBSTRATE AND LIQUID CRYSTAL DISPLAY PANE

TECHNICAL FIELD

The invention relates to display field, and particularly to an array substrate and a liquid crystal display panel.

DESCRIPTION OF RELATED ART

Nowadays, a manufacturing process of a liquid crystal display device (LCD) is complicated, especially when types and numbers of desired masks for a preparation of an array substrate are more, it would cause more manufacturing processes, and production costs could not be reduced. Therefore, how to reduce types and numbers of masks used in the manufacture process is a goal for enterprises to strive.

SUMMARY

Accordingly, embodiments of the invention provide an array substrate and a liquid crystal display panel, which could reduce types and numbers of used masks.

An embodiment of the invention provides an array substrate, comprises a substrate base, a first metal layer, an insulating layer, a second metal layer and a plurality of colored photoresist layers of different colors arranged in an array, the first metal layer, the insulating layer, the second metal layer and the plurality of colored photoresist layers being successively formed on the substrate; wherein the first metal layer comprises a plurality of scan lines disposed along a row direction of the array substrate, the second metal layer comprises a plurality of data lines disposed along a column direction of the array substrate; some of the plurality of colored photoresist layers are overlapped with each other above the plurality of data lines and/or the plurality of scan lines to thereby form a light shielding layer covering metal wires, and the some of the plurality of colored photoresist layers used to form the light shielding layer are a red photoresist layer and a blue photoresist layer.

Another embodiment of the invention provides an array substrate, comprises a substrate base, metal wires and a plurality of colored photoresist layers of different colors arranged in an array, the metal wires and the plurality of colored photoresist layers are formed on the substrate base; wherein some of the plurality of colored photoresist layers of different colors are overlapped with each other above the metal wires to thereby form a light shielding layer covering the metal wires.

In one embodiment, the array substrate comprises a first metal layer, an insulating layer and a second metal layer successively formed on the substrate base; the first metal layer comprises a plurality of scan lines disposed along a row direction of the array substrate, the second metal layer comprises a plurality of data lines disposed along a column direction of the array substrate, and the light shielding layer is disposed covering the plurality of data lines and/or the plurality of scan lines.

In one embodiment, the array substrate further comprises thin film transistor switches located in pixel regions defined by the plurality of scan lines and the plurality of data lines, the light shielding layer further is disposed covering the thin film transistor switches.

In one embodiment, the array substrate further comprises a transparent electrode layer disposed overlying the second metal layer, the first metal layer further comprises common electrode wires, the transparent electrode layer comprises pixel electrodes located in pixel regions defined by the plurality of scan lines and the plurality of data lines and common electrodes disposed overlying the plurality of scan lines and/or the plurality of data lines, and the common electrodes are electrically connected to the common electrode wires by through holes.

In one embodiment, the some of the plurality of colored photoresist layers further are disposed being overlapped with the pixel electrodes, and each of the pixel electrodes only is overlapped with one color of the plurality of colored photoresist layer disposed therebelow.

In one embodiment, the array substrate further comprises thin film transistor switches located in pixel regions defined by the plurality of scan lines and the plurality of data lines, the common electrodes further are disposed overlying the thin film transistor switches.

In one embodiment, the plurality of colored photoresist layers are disposed between the second metal layer and the transparent electrode layer.

In one embodiment, the array substrate further comprises a planarization layer located between the second metal layer and the transparent electrode layer, the plurality of colored photoresist layers are disposed between the second metal layer and the planarization layer.

In one embodiment, the some of the plurality of colored photoresist layers used to form the light shielding layer are a red photoresist layer and a blue photoresist layer.

Further another embodiment of the invention provides a liquid crystal display panel, comprises a color filter substrate, an array substrate disposed spaced from and opposite to the color filter substrate, and a liquid crystal layer disposed between the color filter substrate and the array substrate; the array substrate comprises a substrate base, metal wires and a plurality of colored photoresist layers of different colors arranged in an array, the metal wires and the plurality of colored photoresist layers are formed on the substrate base; wherein some of the plurality of colored photoresist layers of different colors are overlapped with each other above the metal wires to thereby form a light shielding layer covering the metal wires.

In one embodiment, the array substrate comprises a first metal layer, an insulating layer and a second metal layer successively formed on the substrate base; the first metal layer comprising a plurality of scan lines disposed along a row direction of the array substrate, the second metal layer comprises a plurality of data lines disposed along a column direction of the array substrate, and the light shielding layer is disposed covering the plurality of data lines and/or the plurality of scan lines.

In one embodiment, the array substrate further comprises thin film transistor switches located in pixel regions defined by the plurality of scan lines and the plurality of data lines, the light shielding layer further is disposed covering the thin film transistor switches.

In one embodiment, the array substrate further comprises a transparent electrode layer disposed on the second metal layer, the first metal layer further comprises common electrode wires, the transparent electrode layer comprises pixel electrodes located in pixel regions defined by the plurality of scan lines and the plurality of data lines and common electrodes disposed overlying the plurality of scan lines and/or the plurality of data lines, and the common electrodes are electrically connected to the common electrode wires by through holes.

In one embodiment, the some of the plurality of colored photoresist layers of different colors further are disposed to overlap with the pixel electrodes, and each of the pixel electrodes only is overlapped with one color of colored photoresist layer disposed therebelow.

In one embodiment, the array substrate further comprises thin film transistor switches located in pixel regions defined by the plurality of scan lines and the plurality of data lines, the common electrodes further are disposed covering the thin film transistor switches.

In one embodiment, the plurality of colored photoresist layers of different colors are disposed between the second metal layer and the transparent electrode layer.

In one embodiment, the array substrate further comprises a planarization layer located between the second metal layer and the transparent electrode layer, the plurality of colored photoresist layers are disposed between the second metal layer and the planarization layer.

In one embodiment, the some of the plurality of the colored photoresist layers used to form the light shielding layer are a red photoresist layer and a blue photoresist layer.

An array substrate and a liquid crystal display panel of embodiments of the invention, by means of that multiple colored photoresist layers of different colors disposed above metal wires are overlapped with each other to thereby form an opaque light shielding layer covering the metal wires so as to replace a black matrix, and therefore there is no need for a mask process for preparing the black matrix, so that it could reduce types and numbers of used masks, simplify process and reduce production costs.

DETAILED DESCRIPTION OF EMBODIMENTS

In the following, with reference to accompanying drawings in embodiments of the invention, technical solutions of exemplary embodiments provided by the invention will be clearly and completely described.

Figure 1:
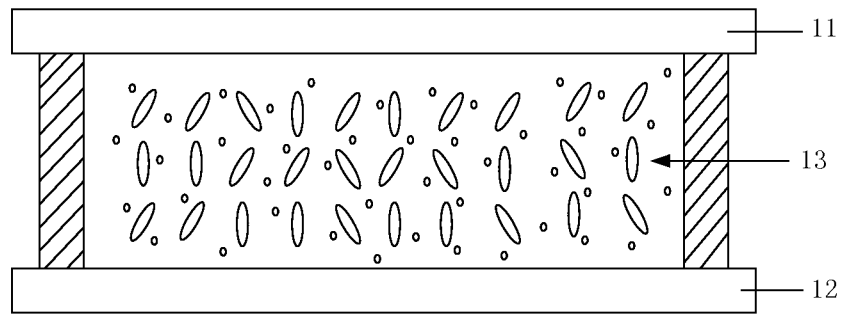
FIG. 1 is a schematic sectional view of a liquid crystal display panel of an embodiment of the invention.
Figure 2:
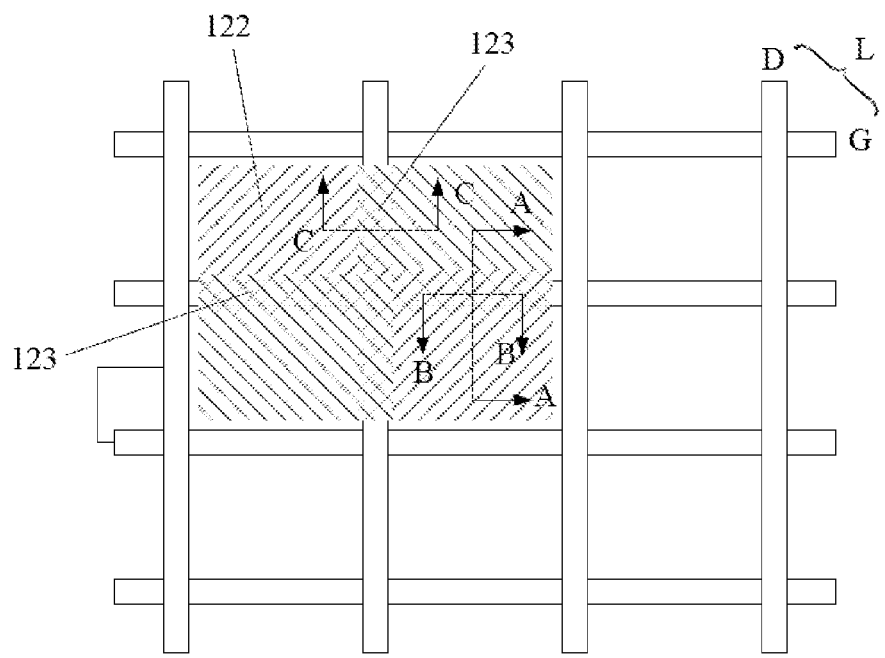
FIG. 2 is a structural schematic view of pixels of an embodiment of the liquid crystal display panel shown in FIG. 1.

FIG. 1 is a schematic sectional view of a liquid crystal display panel of an embodiment of the invention, FIG. 2 is a structural schematic view of pixels of an embodiment of the liquid crystal display panel shown in FIG. 1. Associated with FIG. 1 and FIG. 2, a liquid crystal display panel 10 includes a color filter (CF) substrate 11, an array substrate 12 disposed spaced from and opposite to the color filter substrate 11 and liquid crystals 13 filling in between them, the array substrate 12 includes a substrate base 121, metal wires L 121 and multiple colored photoresist layers 122 of different colors arranged in an array, the metal wires L and the multiple colored photoresist layers 122 are formed on the substrate base.

The multiple colored photoresist layers 122 of different colors are overlapped with each other above the metal wires L to thereby form a light shielding layer 123 covering the metal wires L so as to realize shielding light instead of a black matrix, and therefore there is no need for a mask process for preparing the black matrix, so that it could reduce types and numbers of masks, simplify process and also reduce production costs. Concretely, for the liquid crystal display panel 10 containing red sub-pixels, blue sub-pixels and green sub-pixels, a red photoresist layer of a red sub-pixel permits red-light through, a blue photoresist layer of a blue sub-pixel permits blue-light through, and a green photoresist layer of a green sub-pixel permits green-light through. In view of the fact that only the red photoresist layer and the blue photoresist layer which are superimposed/superposed with each other can realize filtering light, so that the embodiment preferentially chooses only the red photoresist layer (below and accompanying drawings represents the red photoresist layer as R) and the blue photoresist layer (below and accompanying drawings represents the blue photoresist layer as B) to be overlapped with each other above the metal wires L.

The metal wires L includes multiple data lines D disposed along a column direction, multiple scan lines G disposed along a row direction and common electrode wires and other wires. The multiple scan lines G and the multiple data lines D define multiple pixel regions of the array substrate. In four pixel regions only shown in FIG. 2, the colored photoresist layers 122 of different colors are overlapped with each other above the metal wires L.

Figure 3:
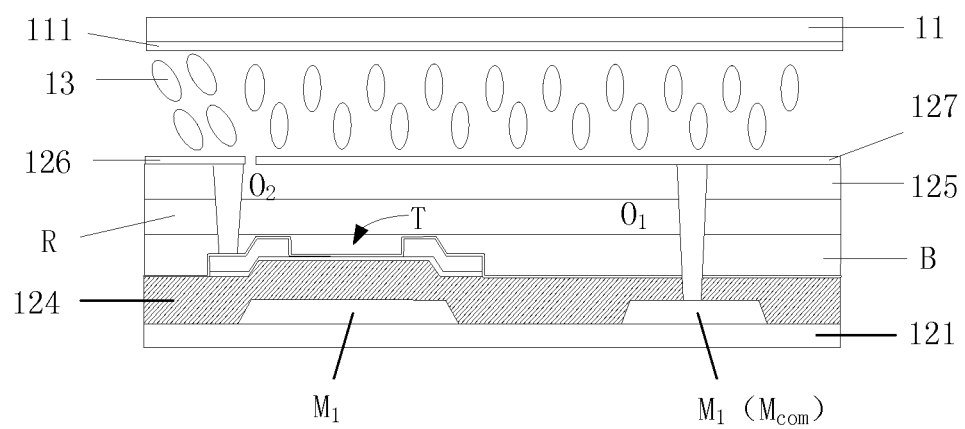
FIG. 3 is a structural sectional view of the liquid crystal display panel shown in FIG. 1 taken along A-A line shown in FIG. 2.
Figure 4:
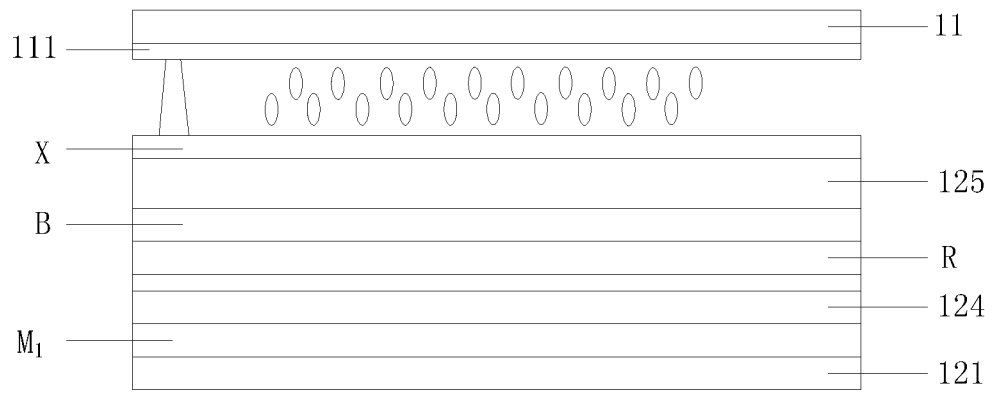
FIG. 4 is a structural sectional view of the liquid crystal display panel shown in FIG. 1 taken along B-B line shown in FIG. 2.
Figure 5:
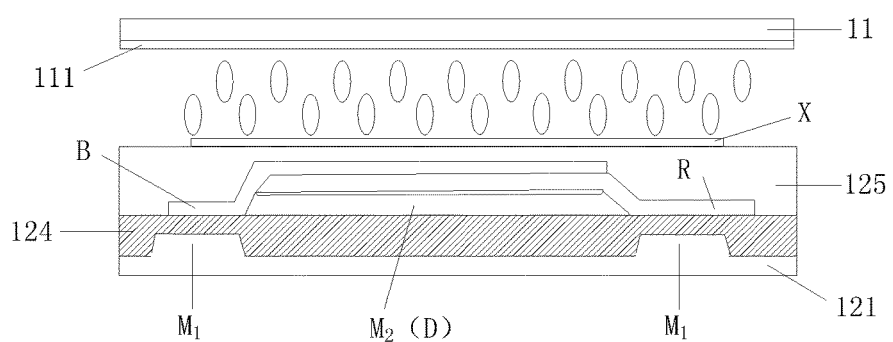
FIG. 5 is a structural sectional view of the liquid crystal display panel shown in FIG. 1 taken along C-C line shown in FIG. 2.

Referring to the structural sectional views of the liquid crystal display panel 10 taken along A-A, B-B, C-C lines shown in FIG. 3 to FIG. 5, the array substrate 12 includes a first metal layer $M_1$, an insulating layer 124 and a second metal layer $M_2$ successively formed on the substrate base 121, the first metal layer $M_1$ and the second metal layer $M_2$ are the metal wires L above mentioned. The first metal layer $M_1$ includes common electrode wires $M_{com}$ and the multiple scan lines G disposed along the row direction, the second metal layer $M_2$ includes the multiple data lines D disposed along the column direction of the array substrate 12. Correspondingly, the light shielding layer 123 is disposed covering the multiple data lines D, the multiple scan lines G and/or the common electrode wires $M_{com}$.

Referring to FIG. 3, the first metal layer $M_1$ further includes gate electrodes of thin film transistor switches T connected with the scan lines D, in view of that the thin film transistor switches T located in the pixel regions defined by the scan lines G and data lines D of the array substrate 12 further needs to be shielded light to improve a display contrast, so that the light shielding layer 123 further are disposed covering the thin film transistor switches T.

Referring to FIG. 3 and FIG. 5, the array substrate 12 further includes a transparent electrode layer X disposed above the second metal layer $M_2$ and a planarization layer 125 located between the transparent electrode layer X and the second metal layer $M_2$, the transparent electrode layer X includes pixel electrodes 126 located in the pixel regions defined by the scan lines D and the data lines G and common electrodes 127 disposed overlying the multiple scan lines D and/or the multiple data lines G, the common electrodes 127 covers the thin film transistor switches T and are electrically connected to the common electrode wires $M_{com}$ by through holes $O_1$. The pixel electrodes 126 and the common electrodes 127 are coplanar. Since one of the multiple colored photoresist layers 122 is used to form a sub-pixel disposed in each of the pixel regions, so that the multiple colored photoresist layer 122 are overlapped with the pixel electrodes 126, and the multiple colored photoresist layers 122 are located between the second metal layer $M_2$ and the planarization layer 125, and each of pixel electrodes 126 only is overlapped with one color of colored photoresist layer 122 disposed therebelow, each of the pixel electrodes 126 is electrically connected to a drain/source electrode of corresponding one of the thin film transistor switches T through holes $O_2$. The through holes $O_1$ and the through holes $O_2$ are all penetrating through the red photoresist layer R, the blue photoresist layer B and the planarization layer 125, the through holes $O_1$ further are penetrating through the insulating layer 124.

Furthermore, when the liquid crystal display panel 10 of the embodiment displays images, an electric potential received by the common electrodes 127 is equal to an electric potential received by common electrodes 111 on the color filter substrate 11, so that liquid crystal molecules located between the common electrodes 127 and the common electrodes 111 could not be deflected, that is, the liquid crystal molecules correspondingly located above the multiple scan lines D could not be deflected, therefore it displays a normally black mode and further acts as a black matrix effect.

A core invention objective of embodiments of the invention is that: by means of that multiple colored photoresist layers of different colors disposed above metal wires are overlapped with each other to thereby form an opaque light shielding layer covering the metal wires so as to replace a black matrix, and therefore there is no need for a mask process for preparing the black matrix, so that it could reduce types and numbers of used masks, simplify process and reduce production costs.

On this basis, the foregoing discussion only is some embodiments of the invention, but it is not therefore limited to the patent scope of the invention, any equivalent structures or equivalent transformation processes made according to the specification and the accompanying drawings of the invention, such as the mutual combination of the technical characteristics of each embodiment, or directly or indirectly used in other related technical field, are similarly included within the patent scope of the invention.

What is claimed is:

1. A liquid crystal display panel comprising a color filter substrate, an array substrate disposed spaced from and opposite to the color filter substrate, and a liquid crystal layer disposed between the color filter substrate and the array substrate;

wherein the array substrate comprises:

a substrate base, a first metal layer, an insulating layer, a second metal layer and a plurality of colored photoresist layers of different colors arranged in an array, the first metal layer, the insulating layer, the second metal layer and the plurality of colored photoresist layers being successively formed on the substrate base;

wherein the first metal layer comprises a plurality of scan lines disposed along a row direction of the array substrate, the second metal layer comprises a plurality of data lines disposed along a column direction of the array substrate; the colored photoresist layers of different colors are overlapped with each other above the plurality of data lines and/or the plurality of scan lines to thereby form a light shielding layer covering metal wires, and all the light shielding layers are formed only by a red photoresist layer and a blue photoresist layer;

wherein the array substrate further comprises:

a transparent electrode layer disposed overlying the second metal layer, wherein the transparent electrode layer comprises pixel electrodes located in pixel regions defined by the plurality of scan lines and the plurality of data lines and first common electrodes disposed overlying the plurality of scan lines and/or the plurality of data lines, and the first common electrodes and the pixel electrodes are coplanar; and a planarization layer between the second metal layer and the transparent electrode layer; wherein the liquid crystal display panel further comprises second common electrodes located on the color filter substrate; when the liquid crystal display panel displays images, a first electric potential received by the first common electrodes is equal to a second electric potential received by the second common electrodes, so that liquid crystal molecules, that are located between the first common electrodes and the second common electrodes and also correspondingly located above the plurality of scan lines and/or the plurality of data lines, are not deflected; a portion of the liquid crystal display panel, that corresponding to the first common electrodes, displays a normally black mode and acts as a black matrix effect.

2. The liquid crystal display panel as claimed in claim 1, wherein the array substrate further comprises thin film transistor switches located in the pixel regions defined by the plurality of scan lines and the plurality of data lines, and the light shielding layer further is disposed covering the thin film transistor switches.

3. The liquid crystal display panel as claimed in claim 1, wherein the first metal layer further comprises common electrode wires, and the first common electrodes are electrically connected to the common electrode wires by through holes.

4. The liquid crystal display panel as claimed in claim 3, wherein the plurality of colored photoresist layers further are disposed being overlapped with the pixel electrodes, and each of the pixel electrodes only is overlapped with one color of colored photoresist layer disposed therebelow.

5. The liquid crystal display panel as claimed in claim 3, wherein the array substrate further comprises thin film transistor switches located in pixel regions defined by the plurality of scan lines and the plurality of data lines, the first common electrodes further are disposed covering the thin film transistor switches.

6. The liquid crystal display panel as claimed in claim 3, wherein the plurality of colored photoresist layers are disposed between the second metal layer and the transparent electrode layer.

7. The liquid crystal display panel as claimed in claim 6, wherein the array substrate further comprises a planarization layer located between the second metal layer and the transparent electrode layer, the plurality of colored photoresist layers are disposed between the second metal layer and the planarization layer.

* * * * *